(12) United States Patent
Latham

(10) Patent No.: US 10,040,500 B2
(45) Date of Patent: Aug. 7, 2018

(54) HEIGHT ADJUSTABLE BIKE

(71) Applicant: Richard David Barnaby Latham, Wellington (NZ)

(72) Inventor: Richard David Barnaby Latham, Wellington (NZ)

(*) Notice: Subject to any disclaimer, the term of this patent is extended or adjusted under 35 U.S.C. 154(b) by 0 days.

(21) Appl. No.: 14/893,918

(22) PCT Filed: May 29, 2014

(86) PCT No.: PCT/NZ2014/000098
§ 371 (c)(1),
(2) Date: Nov. 24, 2015

(87) PCT Pub. No.: WO2014/193245
PCT Pub. Date: Dec. 4, 2014

(65) Prior Publication Data
US 2016/0114845 A1 Apr. 28, 2016

(30) Foreign Application Priority Data
May 29, 2013 (NZ) ........................................ 611256

(51) Int. Cl.
*B62J 1/08* (2006.01)
*B62K 3/02* (2006.01)
(Continued)

(52) U.S. Cl.
CPC ........ *B62J 1/08* (2013.01); *B62K 3/02* (2013.01); *B62K 15/006* (2013.01); *B62K 19/16* (2013.01);
(Continued)

(58) Field of Classification Search
CPC ......... B62J 1/08; B62J 2001/085; B62K 3/02; B62K 15/006; B62K 19/16; B62K 3/10; B29C 45/0704; B29L 2031/3091
See application file for complete search history.

(56) References Cited

U.S. PATENT DOCUMENTS 4,941,674 A 7/1990 Trimble
5,415,423 A 5/1995 Allsop et al.
(Continued)

FOREIGN PATENT DOCUMENTS

AU 2004202366 12/2004
AU 2006100968 12/2006
(Continued)

OTHER PUBLICATIONS

International Search Report Received in PCT/NZ2014/000098, dated Oct. 3, 2014, 8 pages.
(Continued)

*Primary Examiner* — Anne Marie M Boehler
*Assistant Examiner* — Marlon A Arce
(74) *Attorney, Agent, or Firm* — ARC IP Law, PC; Joseph J. Mayo

(57) ABSTRACT

Described herein is a bike including a frame member linking the front and rear wheel(s) made up of a first forward section or sections extending from the front wheel(s) and a second rear section or sections extending from the rear wheel(s). The section endings mate about a lockable connection assembly that is also in communication with a seat-post connected to the seat. The frame sections pivot about a connection assembly axis in a direction perpendicular to the bike frame and the seat-post is able to be moved independent of the frame sections. A key advantage of the above bike is the high range of height adjustability allowing the bike to be used by range of different sized users. Height adjustment is also very easy and may be done toolessly. Further, maintaining the seat in a desired riding alignment independent of frame movement is important otherwise the rider position will change relative to the handlebars leading in extreme cases to falls from the bike. Use of gas assisted injection molding in bike manufacture is also described.

8 Claims, 15 Drawing Sheets

(51) Int. Cl.
    *B62K 15/00*     (2006.01)
    *B62K 19/16*     (2006.01)
    *B29L 31/30*     (2006.01)
    *B29C 45/17*     (2006.01)
    *B62K 3/10*     (2006.01)

(52) U.S. Cl.
    CPC ... *B29C 45/1704* (2013.01); *B29L 2031/3091* (2013.01); *B62J 2001/085* (2013.01); *B62K 3/10* (2013.01)

(56) References Cited

U.S. PATENT DOCUMENTS

| | | | |
|---|---|---|---|
| 5,553,879 | A | 9/1996 | Niemeyer et al. |
| 6,458,306 | B1 | 10/2002 | Nelson et al. |
| D561,649 | S | 2/2008 | Latham |
| 7,487,982 | B2 | 2/2009 | Chan |
| 7,568,720 | B2 | 8/2009 | Golias |
| 7,951,049 | B2 | 5/2011 | Mondello et al. |
| 8,191,931 | B1 | 6/2012 | Mulder |
| 8,286,974 | B2 | 10/2012 | Chen et al. |
| 8,641,071 | B2 | 2/2014 | D'Aluisio et al. |
| 8,967,641 | B2 | 3/2015 | De Roeck |
| 2002/0020249 | A1 | 2/2002 | Darland et al. |
| 2004/0201199 | A1 | 10/2004 | Liebetrau et al. |
| 2005/0070929 | A1* | 3/2005 | Dalessandro .... A61B 17/07207 606/151 |
| 2005/0110317 | A1 | 5/2005 | Britton et al. |
| 2007/0182124 | A1 | 8/2007 | Kettler et al. |
| 2007/0236049 | A1* | 10/2007 | Chapman ............. B62D 25/087 296/193.08 |
| 2008/0061528 | A1 | 3/2008 | Musabi |
| 2009/0152042 | A1* | 6/2009 | Pierick ..................... B62K 3/04 180/311 |
| 2010/0031580 | A1* | 2/2010 | Lee ....................... F25D 23/028 49/504 |
| 2010/0148460 | A1 | 6/2010 | Nelson et al. |
| 2012/0098232 | A1 | 4/2012 | Muzzi |
| 2012/0273287 | A1 | 11/2012 | Song |
| 2013/0020777 | A1 | 1/2013 | Chen |
| 2013/0277941 | A1* | 10/2013 | Ryan .................... B62K 15/006 280/278 |
| 2014/0191492 | A1* | 7/2014 | Al-Sheyyab ........... B62K 19/16 280/288.3 |
| 2016/0059454 | A1* | 3/2016 | Dong ................. B29C 45/1701 264/1.24 |

FOREIGN PATENT DOCUMENTS

| | | |
|---|---|---|
| CN | 2428389 | 5/2001 |
| CN | 201980350 | 9/2011 |
| CN | 201980351 | 9/2011 |
| DE | 102011052290 | 1/2013 |
| EP | 1762471 A2 | 3/2007 |
| EP | 2147852 | 1/2010 |
| FR | 2843089 | 2/2004 |
| GB | 2424596 | 10/2006 |
| KR | 20110075747 A | 7/2011 |
| KR | 20110123438 A | 11/2011 |
| KR | 20120000374 A | 1/2012 |
| KR | 20120025880 A | 3/2012 |
| NZ | 542980 | 9/2007 |
| NZ | 598054 | 5/2013 |
| WO | 9937459 A1 | 7/1999 |
| WO | 1999037459 A1 | 7/1999 |
| WO | 9962759 A2 | 12/1999 |
| WO | 2012085760 | 6/2010 |
| WO | 2011081359 A2 | 7/2011 |
| WO | 2012023092 | 2/2012 |

OTHER PUBLICATIONS

IPRP, NZ2014/000098, dated Sep. 30, 2015, 24 pages.
Supplementary European Search Report Received in PCT/NZ2014/000098, dated Nov. 21, 2016, 13 pages.

\* cited by examiner

HEIGHT ADJUSTABLE BIKE

TECHNICAL FIELD

Described herein is a height adjustable bike. More specifically, a bike, trike or similar device is described wherein the seat height and angle may be adjusted via a lockable connection assembly located on the bike frame.

BACKGROUND ART

Bikes generally comprise a fixed frame configuration with the rider purchasing a frame of an approximate correct size and then adjusting the height of the seat by moving the seat-post. As may be appreciated, this limits the range of adjustment possible meaning manufacturers need to supply a variety of frame sizes to cater for varying height riders. This problem exists in both standard bicycles or tricycles with a crank system as well as foot propelled bicycles commonly termed 'balance bikes'.

For brevity, the term 'bike' is hereafter used throughout this specification, but, as should be appreciated, the term bike for this specification also encompasses tricycles, quad wheel configurations or other multi-wheel configurations of non-motorised conveying devices.

One art design improves the range of size adjustment by using a curved frame section with wheel axes at either end of the frame, and the frame may be flipped over to alter seat height. To minimise the height, the frame is in a concave configuration when viewed from the side and the seat assembly is mounted on the frame about a low point in the frame when assembled. Conversely, to increase the seat height, the frame is flipped over to present a convex side profile and the same seat assembly also flipped resulting in the seat assembly being located about the high point of the frame.

An alternative art product has two adjoining frame sections that pivot in a vertical plane about an axis situated at a mid-point between the frame sections. The sections are held in place using pins that pass through set apertures in the frame sections off set from the pivot axis. Seat height is adjusted to one of three fixed points by removing the pins, adjusting the rear frame section angle relative to the front section and re-fixing the frame sections together again in a pre-set position via the pins. The seat and seat-post are fixedly attached to the front frame section and not adjustable resulting in the seat alignment moving away from an optimum position when the frame is adjusted.

It would be useful to increase the range of size adjustment; offer greater flexibility in height adjustment; allow adjustment in seat alignment independent of the frame height adjustment; or at least provide the public with a choice.

For the purpose of this specification the term 'comprise' and grammatical variations thereof shall have an inclusive meaning—i.e. that it will be taken to mean an inclusion of not only the listed components it directly references, but also other non-specified components or elements.

Further aspects and advantages of the height adjustable bike will become apparent from the ensuing description that is given by way of example only.

SUMMARY

Described herein is a bike, trike or similar device wherein the seat height may be adjusted via a lockable connection assembly located on the bike frame.

In a first aspect there is provided a bike including:
at least two wheels for conveying the bike over a ground surface;
a frame member supported between at least one front wheel and at least one rear wheel, the wheels being located approximate each distil end of the frame;
a handle bar at the front wheel end of the bike in communication with the front wheel(s) and first distil end of the frame;
a seat on which the rider may sit when the bike is used;
wherein the frame member is made up of a first forward section or sections extending from the front wheel(s) and a second rear section or sections extending from the rear wheel(s), the section endings mating about a lockable connection assembly that is also in communication with a seat-post connected to the seat;
wherein the frame sections pivot about a connection assembly axis in a direction perpendicular to the bike frame; and
wherein, the seat-post is able to be moved independent of the frame sections.

In a second aspect there is provided a bike including:
at least two wheels for conveying the bike over a ground surface;
a frame member supported between at least one front wheel and at least one rear wheel, the wheels being located approximate each distil end of the frame;
a handle bar at the front wheel end of the bike in communication with the front wheel(s) and first distil end of the frame;
a seat on which the rider may sit when the bike is used;
wherein the frame member is made up of a first forward section or sections extending from the front wheel(s) and a second rear section or sections extending from the rear wheel(s), the opposing section endings at least partly overlapping and mating together about an axis of rotation to form a lockable connection assembly;
wherein the frame sections pivot about the axis of rotation in a direction perpendicular to the bike frame thereby lifting or lowering the seat height relative to the ground surface on which the bike is placed; and
wherein the lockable connection assembly locks the frame section endings in a fixed orientation via complementary interlocking elements on the connection assembly part or parts.

In a third aspect there is provided a bike including:
at least two wheels for conveying the bike over a ground surface;
a frame member supported between at least one front wheel and at least one rear wheel, the wheels being located approximate each distil end of the frame;
a handle bar at the front wheel end of the bike in communication with the front wheel(s) and first distil end of the frame;
a seat on which the rider may sit when the bike is used;
wherein the frame member is made up of a first forward section or sections extending from the front wheel(s) and a second rear section or sections extending from the rear wheel(s), the opposing section endings at least partly overlapping and mating together about an axis of rotation perpendicular to the bike frame and retained together via a single fastener, wherein the combination of sections and fastener form a lockable connection assembly; and
wherein, on loosening the single fastener, the frame sections are free to pivot about the axis of rotation thereby lifting or lowering the seat height relative to the ground surface on which the bike is placed, and on tightening the fastener, the parts lock together preventing further movement.

In a fourth aspect there is provided a bike including:
at least two wheels for conveying the bike over a ground surface;
a frame member supported between at least one front wheel and at least one rear wheel, the wheels being located approximate each distil end of the frame;
a handle bar at the front wheel end of the bike in communication with the front wheel(s) and first distil end of the frame;
a seat on which the rider may sit when the bike is used;
wherein at least one part selected from: part or all of the frame member, the handle bar, or the seat, are hollow tubular plastic sections manufactured via gas injection moulding.

The bike may be a balance bike not having pedals with the rider's feet being used to propel the bike along. In an alternative embodiment, the bike may have a crankshaft and pedal assembly.

The seat-post may be extended into or out of the connection assembly thereby allowing further seat height adjustment. This adjustment is envisaged as being for micro or small height adjustments while movement of the frame sections may be for macro or larger seat height adjustments. The seat-post and other connection assembly part or parts may also interlink when the connection assembly is fastened together.

A key advantage of the above bike is the high range of height adjustability or micro-adjustability. For example, if a parent purchases a bike for their child, they want the reassurance that the bike will remain rideable by the child for as long as possible while the child grows. A bike that has a high range of height adjustment is more appealing for purchase in these situations than a short range of adjustment. Simple height adjustment is also possible using the design described herein so as to allow quick changes to be made—for example when the bike rider is changed from a taller person to a shorter person. Maintaining a desired seat orientation independent of the frame section orientation is also an advantage as this retains the seat in a comfortable riding position. Further, it is a simple process to adjust the frame height via one linking point (the connection assembly).

BRIEF DESCRIPTION OF THE DRAWINGS

Further aspects of the bike will become apparent from the following description that is given by way of example only and with reference to the accompanying drawings in which.

DETAILED DESCRIPTION

Figure 1:
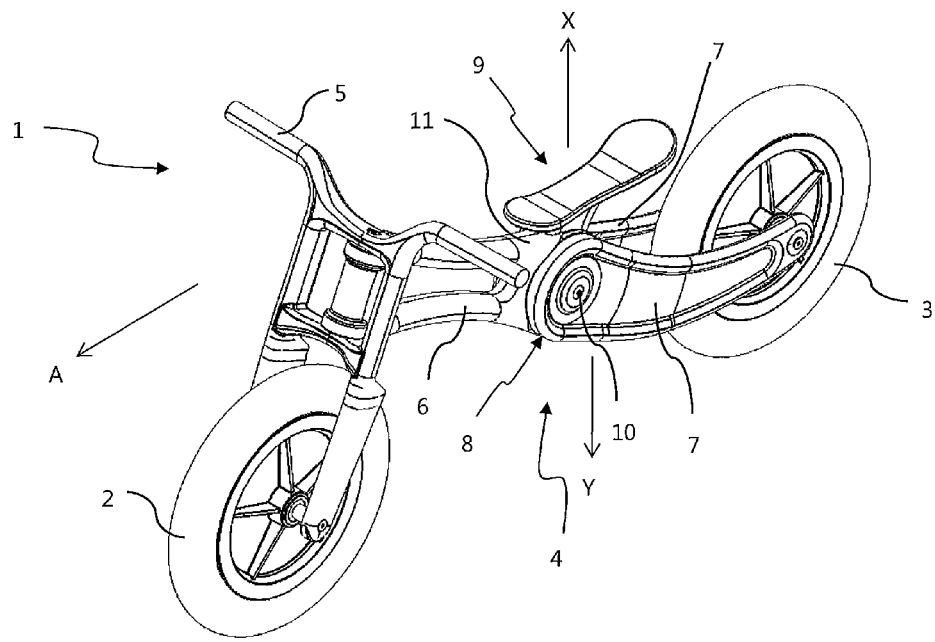
FIG. 1 illustrates a perspective view of a bike in a neutral height position.

As noted above, a bike, trike or similar device is described wherein the seat height may be adjusted via a lockable connection assembly located on the bike frame.

For the purposes of this specification, the term 'about' or 'approximately' and grammatical variations thereof mean a quantity, level, degree, value, number, frequency, percentage, dimension, size, amount, weight or length that varies by as much as 30, 25, 20, 15, 10, 9, 8, 7, 6, 5, 4, 3, 2, or 1% to a reference quantity, level, degree, value, number, frequency, percentage, dimension, size, amount, weight or length.

The term 'substantially' or grammatical variations thereof refers to at least about 50%, for example 75%, 85%, 95% or 98%.

The term 'bike', 'bicycle' or other grammatical variations incorporates two wheel traditional bike formats as well as tricycles or quad wheel arrangements. Tricycle or trike embodiments may include a configuration with two wheels at the back and one wheel at the front or alternatively, a configuration with two wheels at the front and one wheel at the back. Quad bike configurations may include those with two wheels at the front and two wheels at the back.

The term 'front' refers to the direction the rider generally faces when seated on the bike while the term 'back' or 'rear' refers to the end of the bike behind the rider when the rider is seated on the bike.

The terms 'up' or 'lift' and 'down' or 'lower' or grammatical variations thereof refer to the relative vertical movement of the bike seat relative to a ground surface on which the bike is placed, 'up' or 'lift' may be used interchangeably to refer to a movement of the seat generally away from the ground surface, and 'down' or 'lower' may be used interchangeably to refer to a movement of the seat generally towards the ground surface.

The term 'frame' or grammatical variations thereof refers to the primary structural members of the bike including at least a first forward section or sections extending from the front wheel(s) and a second rear section or sections extending from the rear wheel(s). The term 'frame' may also encompass the front and rear wheel axles and the handle bar and fork or forks that retain a front wheel in place.

The term 'toolless' or grammatical variations thereof refers to a mechanism that does not require a separate tool to operate the mechanism.

In a first aspect there is provided a bike including:
at least two wheels for conveying the bike over a ground surface;
a frame member supported between at least one front wheel and at least one rear wheel, the wheels being located approximate each distil end of the frame;
a handle bar at the front wheel end of the bike in communication with the front wheel(s) and first distil end of the frame;
a seat on which the rider may sit when the bike is used;
wherein the frame member is made up of a first forward section or sections extending from the front wheel(s) and a second rear section or sections extending from the rear wheel(s), the section endings mating about a lockable connection assembly that is also in communication with a seat-post connected to the seat;
wherein the frame sections pivot about a connection assembly axis in a direction perpendicular to the bike frame; and
wherein, the seat-post is able to be moved independent of the frame sections.

In a second aspect there is provided a bike including:
at least two wheels for conveying the bike over a ground surface;
a frame member supported between at least one front wheel and at least one rear wheel, the wheels being located approximate each distil end of the frame;
a handle bar at the front wheel end of the bike in communication with the front wheel(s) and first distil end of the frame;
a seat on which the rider may sit when the bike is used;
wherein the frame member is made up of a first forward section or sections extending from the front wheel(s) and a second rear section or sections extending from the rear wheel(s), the opposing section endings at least partly overlapping and mating together about an axis of rotation to form a lockable connection assembly;
wherein the frame sections pivot about the axis of rotation in a direction perpendicular to the bike frame thereby lifting or lowering the seat height relative to the ground surface on which the bike is placed; and
wherein the lockable connection assembly locks the frame section endings in a fixed orientation via complementary interlocking elements on the connection assembly part or parts.

In a third aspect there is provided a bike including:
at least two wheels for conveying the bike over a ground surface;
a frame member supported between at least one front wheel and at least one rear wheel, the wheels being located approximate each distil end of the frame;
a handle bar at the front wheel end of the bike in communication with the front wheel(s) and first distil end of the frame;
a seat on which the rider may sit when the bike is used;
wherein the frame member is made up of a first forward section or sections extending from the front wheel(s) and a second rear section or sections extending from the rear wheel(s), the opposing section endings at least partly overlapping and mating together about an axis of rotation perpendicular to the bike frame and retained together via a single fastener, wherein the combination of sections and fastener form a lockable connection assembly; and
wherein, on loosening the single fastener, the frame sections are free to pivot about the axis of rotation thereby lifting or lowering the seat height relative to the ground surface on which the bike is placed, and on tightening the fastener, the parts lock together preventing further movement.

In a fourth aspect there is provided a bike including:
at least two wheels for conveying the bike over a ground surface;
a frame member supported between at least one front wheel and at least one rear wheel, the wheels being located approximate each distil end of the frame;
a handle bar at the front wheel end of the bike in communication with the front wheel(s) and first distil end of the frame;
a seat on which the rider may sit when the bike is used;
wherein at least one part selected from: part or all of the frame member, the handle bar, or the seat, are hollow tubular plastic sections manufactured via gas injection moulding.

The bike may be a balance bike not having pedals with the rider's feet being used to propel the bike along.

In an alternative embodiment, the bike may have a crankshaft and pedal assembly. More details on this are provided below.

The bike may be non-motorised.

The handle bars may be rotatable about a horizontal plane to allow the bike direction of travel to be controlled by the rider.

The lockable connection assembly may be formed by interlinking the forward and rear sections of the frame about a pivot axis.

In one embodiment, the forward frame section may be a single piece elongated moulded section terminating at the mating distil end of the frame in a circular shape with interlinking elements about the circumference of the circular ending.

The rear frame section may be manufactured as two moulded trailing arms, the ending of each arm having complementary interlinking elements to the ending of the forward section mating to the exterior faces of the forward section.

In one embodiment, the forward frame section and rear arms mate directly together. The forward section and rear arms may mate via interlinking ribs and apertures.

In an alternative embodiment, the rear section may have one face extending outwardly that is smooth and contoured being the exterior of the connection assembly and an opposing side with apertures about the circumference of the circular ending. Sandwiched or situated between the endings of the forward and rear sections may be two rings, one on each side of the forward facing section. The rings may include ribs on each side of the ring surface that mate with the apertures in the frame sections.

The seat-post or seat itself may be integrated into the lockable connection assembly. This offers the advantage of having the various parts integrated into one area and is an aesthetically attractive placement point so that the seat-post will generally extend from the centre of the frame member. Despite this, the seat itself or seat-post may be mounted onto the frame member (front or rear section or sections) and need not be part of the connection assembly.

A mechanical fastener may be used to retain the connection assembly parts together when the assembly is locked. The term 'locked' refers to the assembly parts resisting movement about the connection assembly axis when fixed together. A single fastener may be used. The fastener may pass through the axis of rotation. The single fastener may be adjusted (loosening or tightening) to unlock or lock the connection assembly. Loosening the fastener allows adjustment in the seat height and tightening locks the new position. As may be appreciated, this method of adjustment is simple to effect (for example a single turn of the fastener may be sufficient to loosen the parts). The method minimises the risk of losing parts since it is not necessary to fully remove the fastener hence all parts of the bike remain connected during adjustment. In addition, only one action (fastener loosening) is needed to adjust the height unlike other art pivot joints that require multiple steps and removal of parts. The fastener may be a nut and bolt.

In a further embodiment, the fastener may include a bias mechanism that urges the connection assembly parts together to automatically lock the connection assembly when movement is completed. Unfastening may occur by for example, pulling against the bias urging force.

In more detail, seat height adjustment may be completed by loosening the fastener and rotating the frame sections about the pivot axis until the desired seat height position is reached, re-aligning the ribs and apertures together and re-applying the fastener. Frame movement to adjust the seat height relative to the surface on which the bike is placed is termed herein as macro height adjustment.

As noted above, the bearing surfaces of the connection assembly may include interlinking elements. In one embodiment, the interlinking elements may be male and female elements that complement each other. The interlinking elements may be mating ribs and apertures on the surface of each part. The rib and aperture design offers several advantages including reducing the need to fully tighten a fastener or fasteners at the pivot point since the rib/aperture connections help retain the parts in position removing load from the fastener. The risk of over-torquing the fastener and for example causing cross-threading is also avoided by this design.

The rib/aperture connection assists with avoiding slipping about the pivot point during use. The rib/aperture approach also pre-sets a variety of points at which the height can be set to.

Other ways to interlink the parts may include use of high friction surfaces such as roughened surfaces (random or regular such as a random or regular spaced dotted surface) that, at a micro level interact to prevent motion between the abutting faces.

Another alternative interlinking method may be to use a protruding feature from one face that inserts into a corresponding aperture or apertures in the opposing face and acts to grip the parts together. Protruding features may be lugs, tongues, flanges and the like.

As an alternative to interlinking elements or in conjunction with interlinking elements, a clamping mechanism or mechanisms may be used around the connection assembly parts to retain the parts together.

A yet further alternative to retaining the connection assembly in a desired fix alignment may be to use a pin or fastener inserted through some or all of the connection assembly parts, the insertion point being off centre to the axis of rotation, thereby preventing rotation while the pin/fastener or pins/fasteners are inserted. The pin(s)/fastener(s) may be removed to allow rotation.

One end of the seat-post may be connected to a seat that supports a rider and the opposing end of which may mate with the connection assembly. The seat-post may key into the connection assembly part or parts so as to constrain movement of the seat-post when the connection assembly is locked. The seat post may be moved generally up or down for a smaller range of seat height adjustment termed herein as micro height adjustment.

In one embodiment, the connection assembly may include a seat clamp interlock. One side of the interlock may have extending teeth that mate with complementary teeth in the rear frame section. The tooth profile between the interlock and frame section or section parts may differ to that between the frame sections and ring or rings thereby resulting in a different rate of movement of the frame section relative to the seat-post.

One side of the seat clamp interlock may include two extending members that pass around at least part of the seat member seat-post and act as a stop to prevent excessive movement of the seat member about the pivot axis.

The clamp interlock offers the advantage of being able to adjust the seat height and orientation independently of frame member adjustment. Independent movement is preferable as, when the frame sections are adjusted, the seat alignment also adjusts, typically to a position that is not ideal for riding (tipping the rider forwards or backwards).

Interlinking features such as ribs and apertures may also be used between the face of the seat clamp interlock and seat-post face to assist with preventing movement up or down of the seat when the connection assembly is locked.

In the bike above, when the frame sections pivot about the connection assembly axis, the seat height may lift or lower relative to the ground surface on which the bike is placed. Adjustment of the frame sections allows for macro height adjustment. In one embodiment, adjustment of the frame sections only by rotation of the connection assembly may be used to vary the seat height relative to the ground surface on which the bike is placed by approximately 150, 175, 200, 225, 250, 275, 300, 325, 350, 375, 400, 425, 450 mm. The range of adjustment may be from 150 to 450 mm. The range may be 200 to 440 mm The frame section or sections at the rear of the bike may have an arc shaped side profile and may be flipped over to further increase the range of height adjustment. For example, the rear section may have a concave side cross-section when in a lowered configuration and a convex side cross-section when in a raised configuration. In one embodiment, by flipping the rear section or sections, the macro height adjustment range may be increased by a further 40-50 mm.

While the range of macro height positions may be infinite between the maximum height and minimum height, selected heights may be pre-selected during manufacture by choice of rib and aperture placement. This may limit the range of adjustment for example to: 10, 15, 20, 25, 30, 35, 40, 45 or 50 mm increments. The increment may be 10 to 50 mm. The increment may be 30-40 mm. The above macro height measurements have been provided by way of illustration of the range of motion and versatility possible based on selected designs of bike. It should be appreciated that the range of motion may be further varied, for example by increasing or reducing the frame component size, increasing or reducing the connection assembly size, or by increasing or reducing the wheel diameter.

Also as noted above, the seat height may be adjusted at a micro level by movement of the seat-post. In one embodiment, changing the seat height may be achieved by moving the seat-post into and out of the connection assembly. Adjustment may be completed by unfastening a fastener about the pivot point and moving the seat height up or down independent of the pivot point via an elongated slot opening in the seat-post through which the fastener passes. The bottom of the seat-post may be designed so as to not protrude outside the connection assembly when at a lowest point. In one embodiment, the seat-post ending lies flush with the bottom of the frame section distil end or ends when the seat is in a fully lowered position. By way of illustration, seat height adjustment may allow for a 1, 2, 3, 4, 5, 6, 7, 8, 9, 10, 15, 20, 25, 30, 35, 40, 45, 50, 55, 60, 65 or 70 mm range of seat height adjustment relative to a ground surface on which the bike is placed. In one embodiment the seat height may be adjusted at a micro level by approximately 1-60 mm. The range of positions at which the seat height may be fixed may in be infinite or, where interlinking elements are used such as ribs and apertures, the range of positions may be in 2-4 mm increments. It should be appreciated that the range of micro height movement described may be varied, for example by increasing the seat-post and opening length, and the above dimension figures are provided by way of illustration only.

All three height adjustment factors (macro, micro and rear section frame flipping) may be used to alter the bike seat height relative to a ground surface on which the bike is placed. The full range of movement using all three methods of height adjustment in one embodiment may be from 200 mm to 500 mm ground to seat height.

As should be appreciated from the above, a wide range of height adjustments may be made. As may further be appreciated, assuming the bike were designed for a child, the range of height adjustment allows children from as early as 12 months to begin riding the bike and children up to 6 years old or more may still be able to ride the bike. The wide range of height adjustment also provides versatility for children to use a bike where height extremes exist—for example children with dwarfism may require a very low configuration and, at the other extreme, some children even for natural reasons, are far taller than their peers yet are not mature enough to ride a standard bike. In these circumstances, the above described bike may still be suitable.

As noted above, in selected embodiments the bike may have a crank system including pedals linked to a crank shaft and a communication means between the crank shaft and wheel or wheels to translate movement of the pedals to movement of the wheel or wheels. The communication means between the crankshaft and wheel or wheels may be a chain or belt. Pedal movement may be translated into movement of the rear wheel or wheels via the communication means.

The design of the crank system may be such that movement of the connection assembly does not substantially alter the tension on the belt or chain. As may be appreciated, altering the belt or chain tension would be undesirable as, in extreme cases, the tension would prevent movement of the frame sections or instead might compromise the ability for the chain or belt to remain attached e.g. if the chain had insufficient tension.

In one embodiment the bike may have a crank system mounted to the frame. In one specific embodiment, the crank system may be formed integral to the connection assembly. In this embodiment, the crank system may include two support members, each support member made up of a moulding shaped as a ring interfacing with the connection assembly at one end and a boss forming a bottom bracket sleeve at the opposing end through which a crank shaft may be inserted. The support member ring sections may include rib projections that key into complementary apertures in one or more of the connection assembly parts. The bosses forming the bottom bracket sleeve (and crank shaft) may be housed within an enclosure. The enclosure may be manufactured from aluminium or glass filled nylon.

In one embodiment, the bike may be manufactured in part or in full from plastic parts including moulded sections for the frame, handle bars, seat-post, wheel rims and so on. The plastic may be recycled plastic. The frame member sections may be moulded plastic sections. The handle bar may be a moulded plastic section. The seat and/or seat-post may be moulded plastic sections. The moulded plastic (recycled or virgin) parts used in the bike may be manufactured from aluminium or glass filled nylon.

Parts of the bike including the frame sections, seat-post, handle bar and forks may be manufactured by gas assisted injection moulding thereby forming hollow contoured plastic parts that achieve a lighter and stronger form of bike than other methods of manufacture. The inventor is not aware of other bike parts being manufactured via gas injection moulding and has found this method to be a great advantage in achieving lower weight, sufficient strength/uniformity in shape wall width, and giving an aesthetically pleasing finish.

In more detail, gas assisted injection moulding is a controlled-pressure process that uses an inert gas (most commonly nitrogen) to apply uniform pressure throughout a moulded plastic part when the part is formed. By spreading molten plastic throughout the mould, the process creates a hollow part with even wall thickness.

With respect to bikes and trikes, the method was found by the inventor to be particularly useful despite art publications on gas assisted moulding arguing that it had limitations on part size and was not useful where parts had corners or bends. Bikes and trikes must have a rigid construction to withstand the torsional and other forces and stresses occurring when in use. They must also be lightweight because the rider propels the bike with their own energy and greater weight slows the rider. There is therefore a trade off between strength and weight.

One art method of achieving the desired optimum is to use steel, aluminium or metal composite materials formed into a tubular shape. Bikes made this way are far from perfect in that they:
 (a) have stress points where components are welded at a joint;
 (b) may include sharp edges;
 (b) corrode due to weather or deteriorate due to wear and accidental impact;
 (c) consume large quantities of virgin raw materials; and
 (d) have a traditional non-organic aesthetic.

One solution already in use is to employ composite materials such as carbon fibre. These composites are exceptionally lightweight and to a point strong. They also do not deteriorate due to weathering. The downside of such materials are that they can be brittle hence need more care than metals and alloys. Composites are also dramatically more expensive. As a result of these downsides, composites are generally only used in higher performance bikes.

Traditional materials used for injected moulds include various polymers such as polyproylene. These materials are often inexpensive and widely used but they lack the strength and rigidity to be commercially useful in bike or trike applications apart from small non-structural parts. The reality of these materials is that, in order to achieve the strength and rigidity needed, larger volumes of material are required and/or additives such as glass fibre must be used, the end result being a heavy bike or trike and completely outstripped by other materials.

The inventor has found that in fact, through use of gas assisted injection moulding, the balance of strength and weight can be achieved plus there are numerous other advantages realised.

Key benefits of Gas Assisted Injection Molding are that it reduces production time, cost, weight and waste. Specifically:

The process saves on the amount of raw material needed;

Through less materials being necessary, the overall part weight and cost is reduced;

An improved surface finish is possible compared to thick-walled injection moulded parts;

The process leads to a quicker cycle time particularly compared to steel tube formation;

The process surprisingly leads to a dramatically reduced level of warpage (up to 90%) compared to injection moulded parts;

The tooling cost for bike manufacture is reduced as the need for multiple drops and hot runner systems in long shapes is avoided or reduced unlike injection moulded parts;

The number of parts needed could also be reduced since, contrary to art publications, complex shapes could be formed as one part. In addition, the wall thickness within a part may be varied as well unlike art methods.

The materials used to manufacture the bike or trike parts may be engineered resins. As may be appreciated, these materials are relatively low cost and strong.

Gas assisted injection moulding also has the advantage of being a highly scalable production process hence, once a single part is made well, the process can then be used to manufacture many more pieces of the same standard.

Traditionally, component junctions are joined at a weld point, which can fail or be a weak point in construction. Gas assisted injection moulding removes weld points and weak junctions. In addition, offset elements can be designed and moulded to overlap, thereby spreading the load, minimising stress points and increasing the structural strength of the bike frame.

The bike may have parts formed via gas assisted injection moulding into unique design forms/profiles. Via gas assisted injection moulding, it is possible to create multiple shapes in the one piece unlike art parts. By way of example, a single part may for structural strength include shapes such as oval, elliptical (e.g. part of the frame or forks) and i-beam construction (e.g. rear stays).

In one embodiment, at least one part may have both hollow and non-hollow (solid) elements. This combination may be done to maximise strength, minimise weight and provide an aesthetic change.

The inventor has further found that incorporating high volume overflow during gas assisted moulding enables complete and smooth flow through the entirety of the part, reducing (a) number of vents required and (b) flow marks caused by uneven filling of the mould.

Optionally, products produced by the gas assisted injection moulding process may have applied a fine textured finish for high quality feel and to conceal any molding imperfections.

The bike or trike as noted above with respect to gas assisted injection moulding may be manufactured to have a single frame piece linking the rear wheel(s) to the front fork or may instead use the lockable connection described herein.

The above adjustments in connection assembly position may be adjusted toollessly or without the use of a separate tool to remove or replace parts. In one embodiment, the fastener at the pivot axis may have a handle or handles to allow a user to unfasten the connection assembly without using tools. As may be appreciated, the use of a tool could detract from the usability and durability of the bike as tools complicate the process of re-arranging the parts. Separate tools also may be lost hence avoiding the need for tools may be preferable. Notwithstanding the above, tools may be used and use of tools is not expressly excluded from the scope of the description made herein.

A key advantage of the above bike is the high range of height adjustability. For example, if a parent purchases a bike for their child, they want the reassurance that the bike will remain rideable by the child for as long as possible while the child grows. A bike that has a high range of height adjustment is more appealing for purchase in these situations than a short range of adjustment. Simple height adjustment is also preferable so as to allow quick changes to be made—for example when the bike rider is changed from a taller person to a shorter person. Further, maintaining the seat in a desired riding alignment independent of frame movement is important otherwise the rider position will change relative to the handlebars leading in extreme cases to falls from the bike.

The embodiments described above may also be said broadly to consist in the parts, elements and features referred to or indicated in the specification of the application, individually or collectively, and any or all combinations of any two or more said parts, elements or features, and where specific integers are mentioned herein which have known equivalents in the art to which the embodiments relates, such known equivalents are deemed to be incorporated herein as of individually set forth, Where specific integers are mentioned herein which have known equivalents in the art to which this invention relates, such known equivalents are deemed to be incorporated herein as if individually set forth.

WORKING EXAMPLES

The above described bike and the various configurations the bike may be moved to are described below by reference to specific examples.

Example 1

Figure 2:
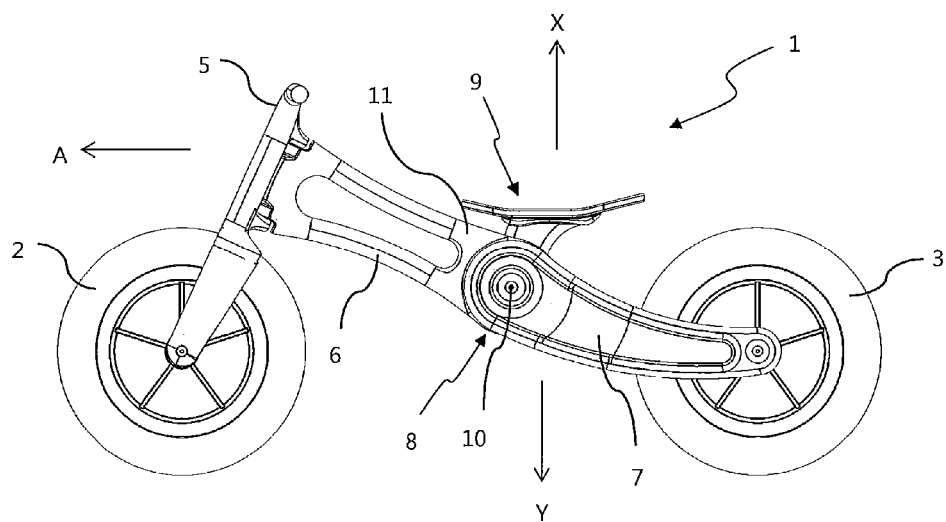
FIG. 2 illustrates a side view of a bike in a neutral height position.
Figure 3:
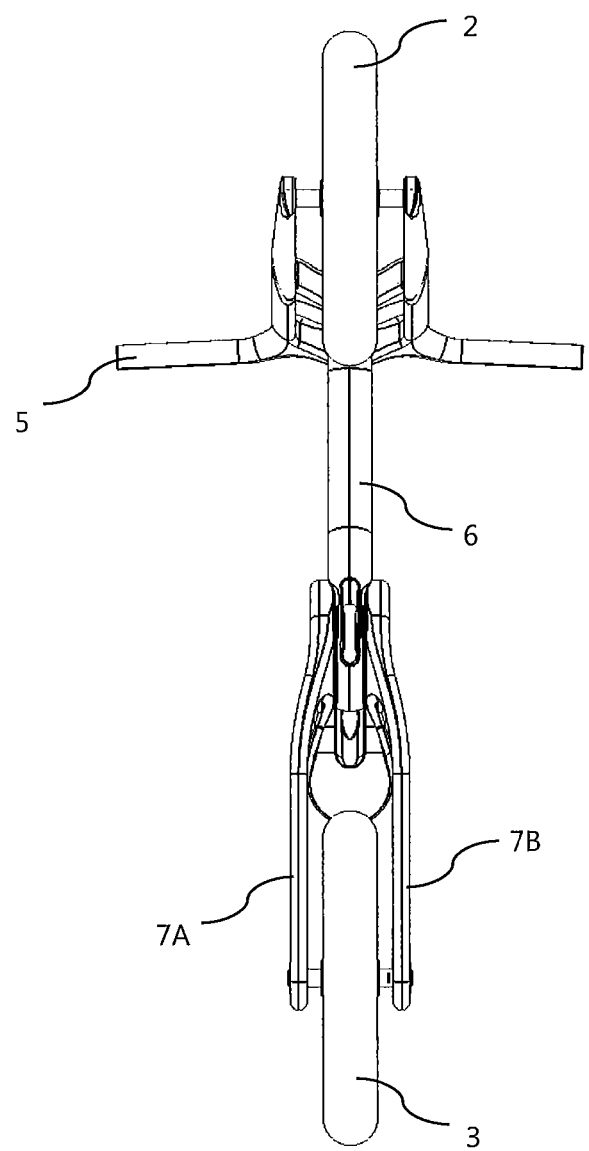
FIG. 3 illustrates an underside view of a bike in neutral height position.
Figure 4:
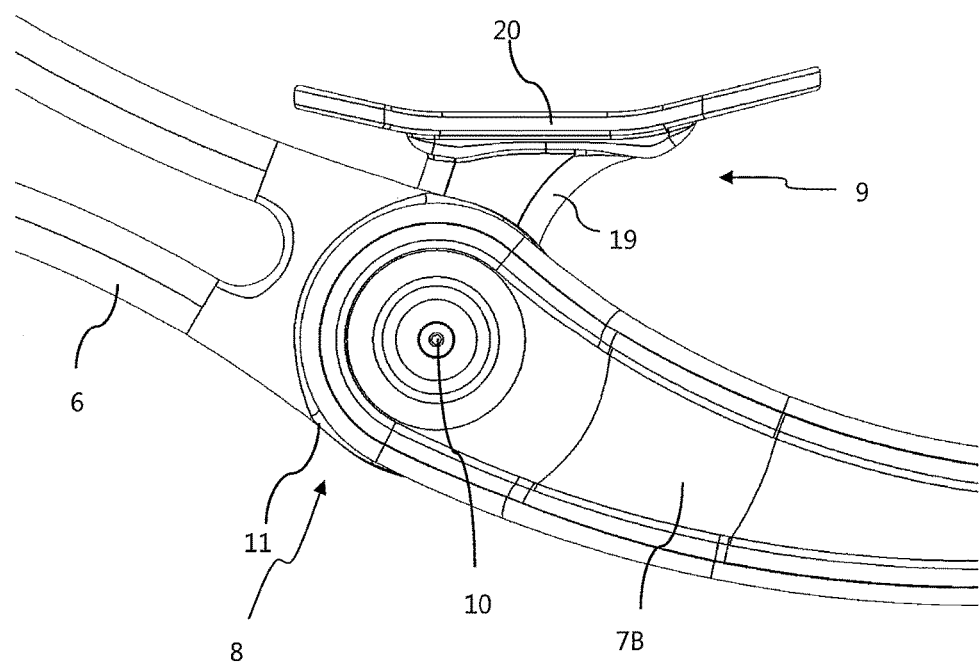
FIG. 4 illustrates a detail side view of a pivot joint configuration.
Figure 5:
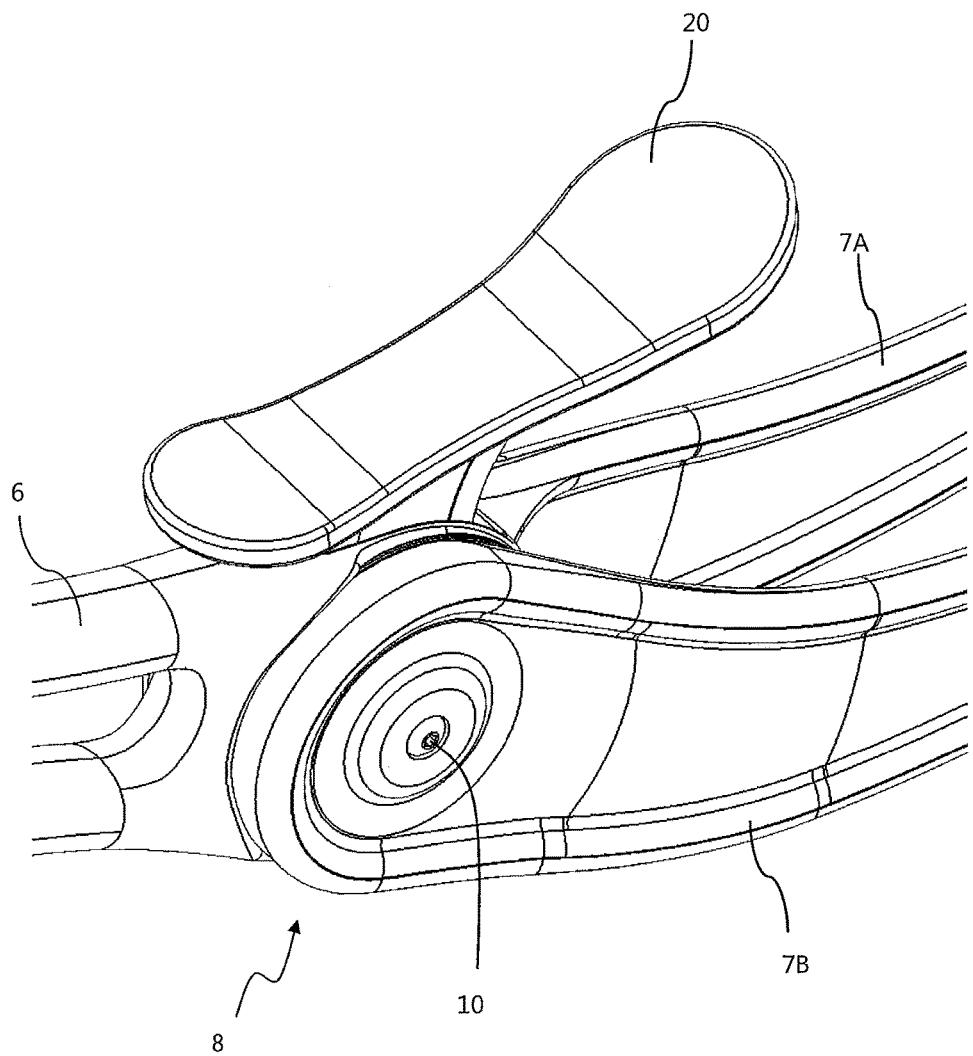
FIG. 5 illustrates a detail perspective view of a pivot joint configuration.
Figure 6:
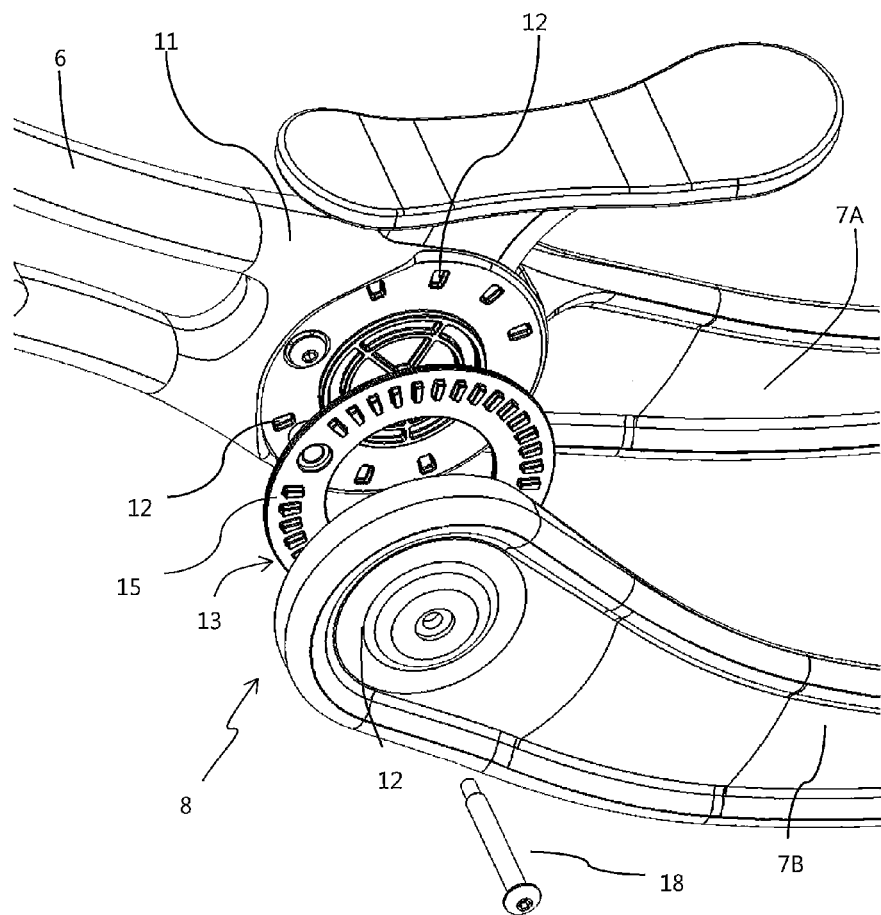
FIG. 6 illustrates a further perspective view of a pivot joint configuration with selected parts in an exploded configuration.
Figure 7:
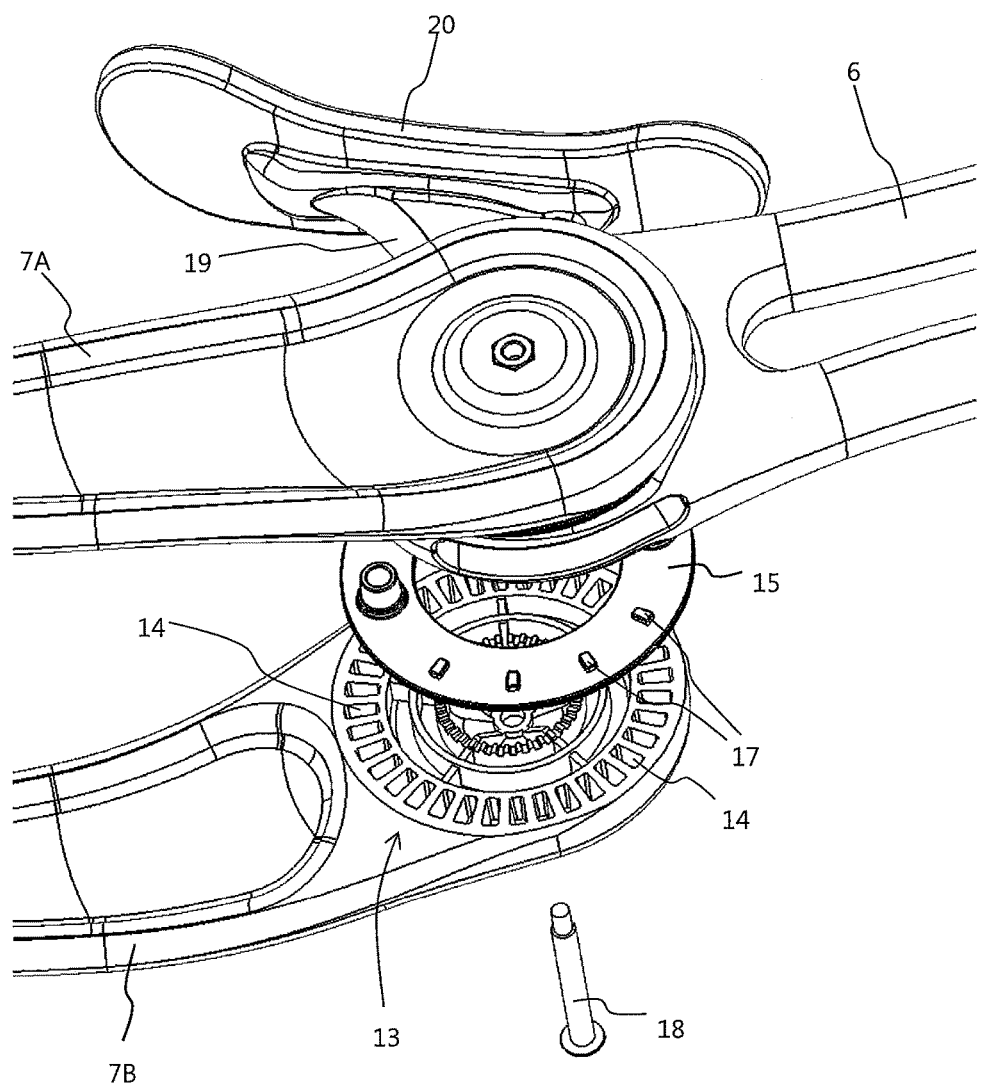
FIG. 7 illustrates a further perspective view of a pivot joint configuration with selected parts in an exploded configuration from the opposing side as that shown in FIG. 6.
Figure 8:
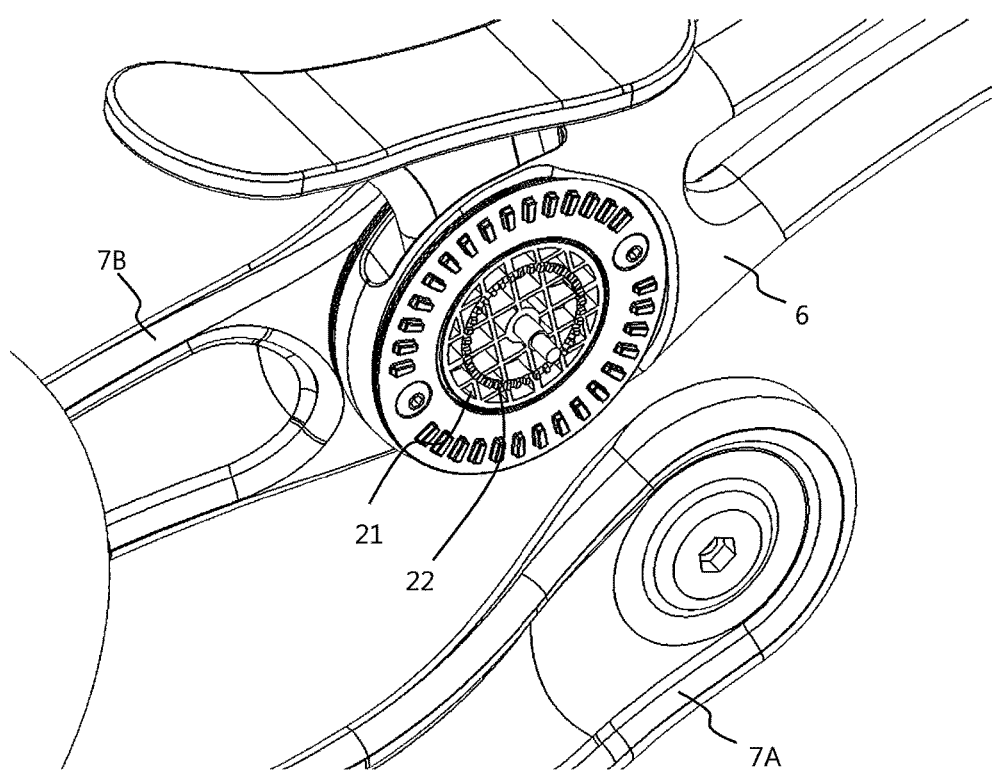
FIG. 8 illustrates a side view of the bike with a rear section pulled away to illustrate the seat clamp interlock.

Referring to FIGS. 1-3, a bike 1 in the form of a children's balance bike is illustrated when in a neutral position i.e. not extended fully high or fully low.

In the embodiment shown, the bike 1 includes two wheels 2,3 for conveying the bike 1 over a ground surface (not shown). A frame member generally indicated by arrow 4 is supported between the front wheel 2 and the rear wheel 3. A handle bar 5 is shown approximate the front wheel 2 end of the bike 1 in communication with the first wheel 2 and first distil end of the frame 4 rotatable about a horizontal plane to allow the bike 1 direction of travel to be controlled. The frame 4 member is made up of a first 6 and second section 7 mating about a lockable connection assembly 8. The connection assembly 8 is also in communication with a seat-post 9. The lockable connection assembly 8 pivots the frame sections 6,7 about a connection assembly 8 axis 10 in an orthogonal direction relative to the bike 1 plane of travel indicated by arrow A, thereby lifting or lowering the seat height relative to the wheel axes of the bike in direction X or Y as shown.

The lockable connection assembly 8 locks the frame section parts 6,7 in a fixed orientation via at least one interlocking element (see FIGS. 4 to 11 for more details).

On lifting or lowering of the frame sections 6,7, the seat-post 9 remains in a substantially upright position moving independently to the frame members 6,7. The seat-post 9 mates with the connection assembly 8 assembly. More details on this are described below and with reference to FIGS. 8 to 11.

The forward frame section 6 is an elongated moulded section terminating at one distil end 11 in a circular shape with apertures 12 about the circumference of the circular ending 11.

The rear facing frame section 7 is manufactured in two moulded parts 7A, 7B although could be moulded as one piece with a forked ending at the connection assembly 8. The ending of each rear frame part 7A, 7B has a complementary circular shape to the ending of the forward facing section 11.

Each rear facing section 7A, 7B has one face extending outwardly 12 that is smooth and contoured being the exterior of the connection assembly 8 and an opposing side 13 has similar apertures 14 about the circumference of the circular ending as the distil end of the forward facing section 6.

Sandwiched between the two mating sections 6, 7A and 6, 7B are two circular shaped rings 15,16, one on each side of the forward facing section 6 distil ending 11. The rings 15,16 include raised ribs 17 on each side of the ring 15,16 surface that mate with the apertures 12, 14 in the frame sections 6, 7A, 7B.

A mechanical fastener 18 being a nut and bolt retains the connection assembly 8 parts together when the connection assembly 8 is locked.

Adjustment is completed by loosening the fastener 18 and rotating the parts about the pivot axis 10 until the desired seat-post 9 height is reached and then re-locking the parts by re-aligning the ribs 17 and apertures 12,14 together and re-tightening the fastener 18.

The seat-post 9 includes a seat-post 19, one end of which includes a seat 20 that supports a rider (not shown) and the opposing end of which extends into an aperture in the front section 6 approximate the distil end 11 thereby integrating the seat-post 19 into the connection assembly 8.

The seat-post 19 keys into the connection assembly 8 part or parts so as to constrain movement of the seat-post when the connection assembly 8 is locked in position. The connection assembly 8 includes an interlock 21 having a cylindrical shape that nests within the internal diameter of one of the rings 15,16 noted above.

One side of the interlock 21 has extending teeth 22 that mate with complementary teeth 23 in the rear frame section 7A. Note, the interlock 21 may be on the opposing side with the teeth 22 interlinking with teeth (not shown) on the opposed rear frame section 7B.

The opposing side of the interlock 21 includes two extending members 24,25 that pass at least partially around the seat-post 19 and act as a stop to prevent back and forth movement of the seat-post 9 about the pivot axis 10.

The teeth 22 profile between the rear frame section 7A and the interlock 21 may have a different profile to the rib/aperture profile between the frame sections 6, 7A, 7B and the opposing ring or rings 15,16 thereby resulting in a different rate of movement of the frame section(s) 6,7 relative to the seat-post 9.

Adjustment of the connection assembly 8 varies the seat 20 height relative to the wheel 2,3 axles by for example, approximately 30 to 500 mm.

The seat 20 height can also be adjusted by moving the seat-post 19 into and out of the connection assembly 8. Height adjustment is completed by loosening the fastener 18 about the connection assembly 8 pivot point 10 and moving the seat 20 up or down independent of frame section 6,7 movement via a guide opening 23 in the seat-post 19 through which the fastener 18 passes. The bike 1 seat 20 height adjustment via the seat-post 19 allows for example, a 1 to 40 mm range of seat 20 height adjustment.

Example 2

Figure 12:
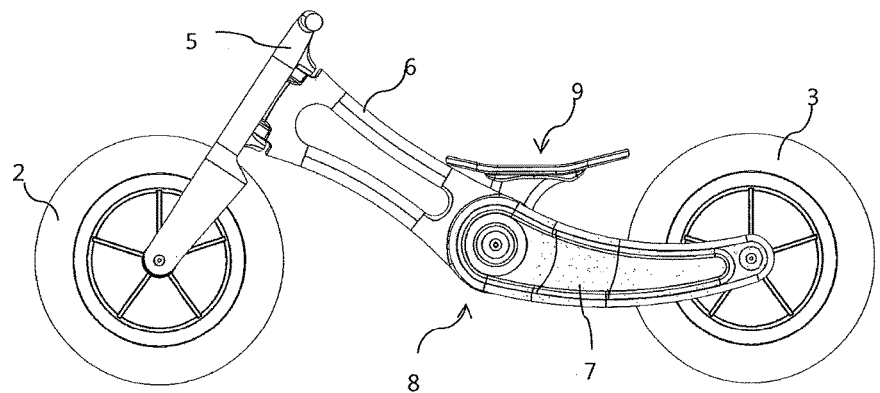
FIG. 12 illustrates a side view of the bike in a fully lowered configuration.
Figure 13:
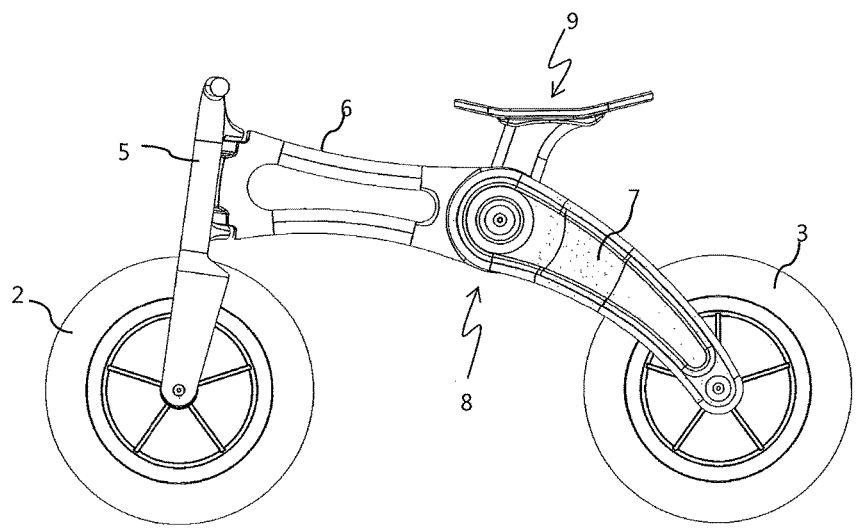
FIG. 13 illustrates a side view of the bike in a fully raised configuration.

As shown in FIGS. 12 and 13, the bike 1 seat 20 height can be lowered (FIG. 12) by lowering the pivot point 10 of the connection assembly 8 or raised as shown in FIG. 13.

As should be appreciated, the seat remains upright during height adjustment. Once the fastener 18 is tightened, the connection assembly parts are retained in place via the interlocking parts thereby avoiding slippage or unwanted changes in alignment.

Example 3

Figure 14:
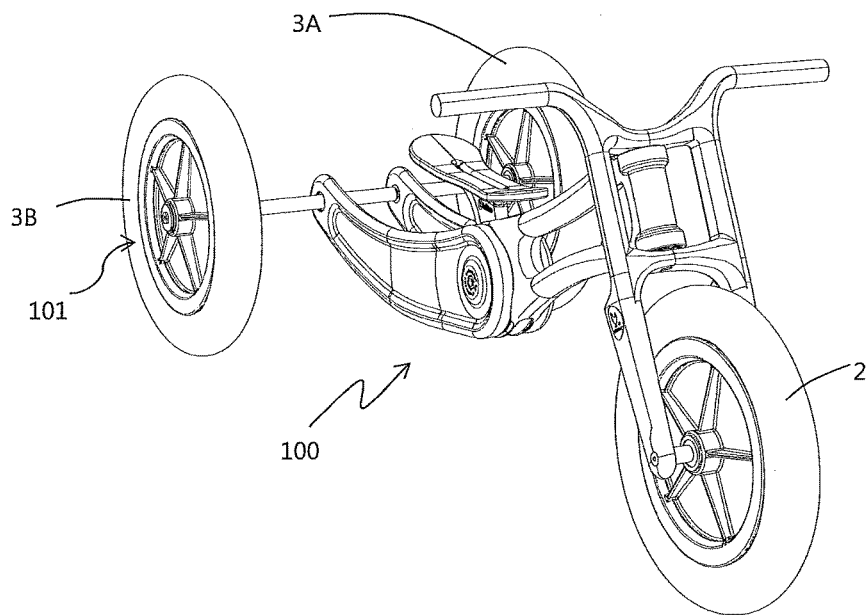
FIG. 14 illustrates a tricycle embodiment.

Examples 1 and 2 described a two wheeled balance bike 1. As shown in FIG. 14, the same principle may be applied to a tricycle 100 embodiment using three wheels 2,3A, 3B. As should be appreciated, the two wheeled end 101 may be reversed (not shown). Quad wheel arrangements (not shown) may also utilise the same principles for seat 20 height adjustment as described herein.

Example 4

Examples 1 to 3 describe a balance bike 1, 100. The same principles may also apply to a bike with a crank assembly.

Figure 15:
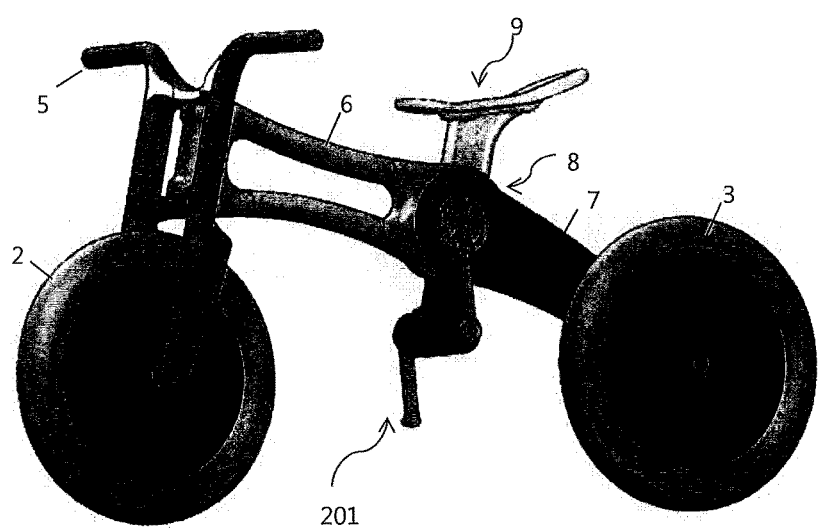
FIG. 15 illustrates a bike with a crank attached to the outside of the bike connection assembly with the drive communication means removed for clarity.
Figure 16:
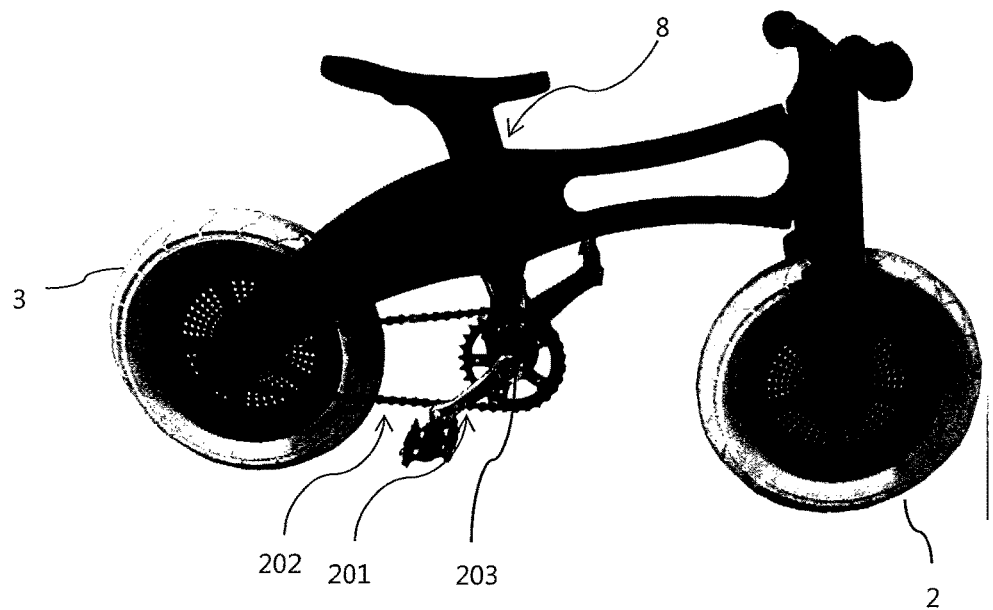
FIG. 16 illustrates a bike with a crank attached within the connection assembly and including a drive chain to a rear wheel.
Figure 17:
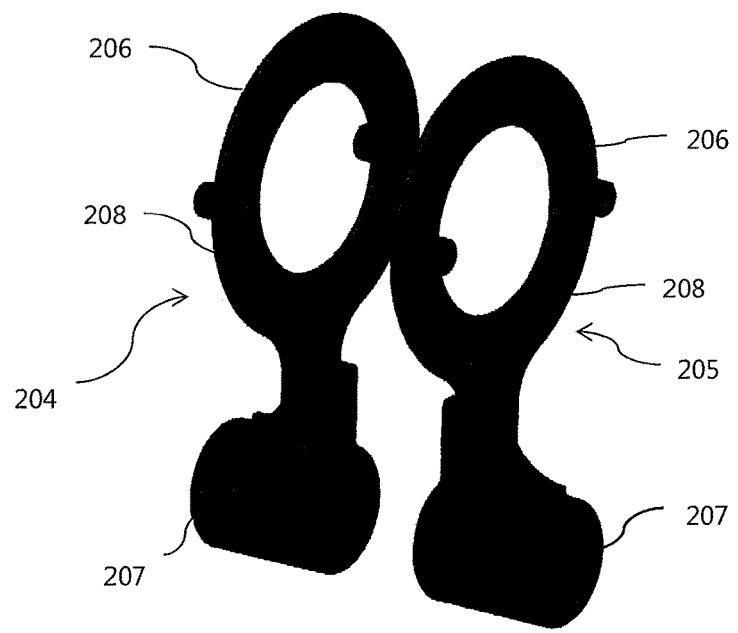
FIG. 17 illustrates a detail view of one embodiment of the bike crank assembly.

FIGS. 15 to 17 show ways to integrate a crank assembly generally indicated by arrow 201.

FIG. 15 shows a crank assembly 201 with a drive means removed for clarity. The drawing illustrates the way the crank assembly 201 may be hung from the exterior of the connection assembly 8.

FIG. 16 shows a crank assembly 201 with a drive means 202 in the form of a chain. As should be appreciated, a belt may also be used to transfer rotational movement of the crank shaft 203 to the wheel or wheels 2,3. The drawing illustrates the way the crank assembly 201 may be hung from inside the connection assembly 8 thereby integrating the crank assembly 201 into the wider connection assembly 8 parts.

FIG. 17 shows two potential support members 204, 205. Each support member is a moulded shape including a ring portion 206 interfacing with the connection assembly 8 (not shown) and a boss 207 forming a bottom bracket sleeve at the opposing end through which a crank shaft (not shown) may be inserted. The support member 204,205 ring portions 206 include rib projections 208 that key into complementary apertures (not shown) in one or more of the connection assembly 8 parts.

Example 5

Figure 9:
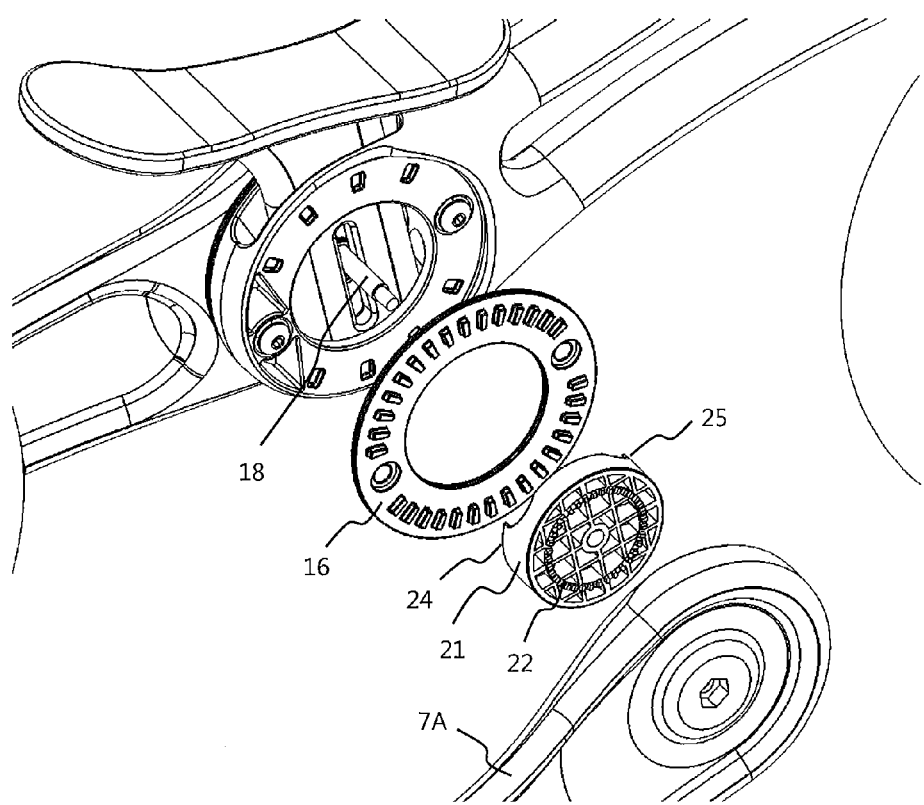
FIG. 9 illustrates the same view as in FIG. 8 with further parts removed to further illustrate the seat clamp interlock.
Figure 10:
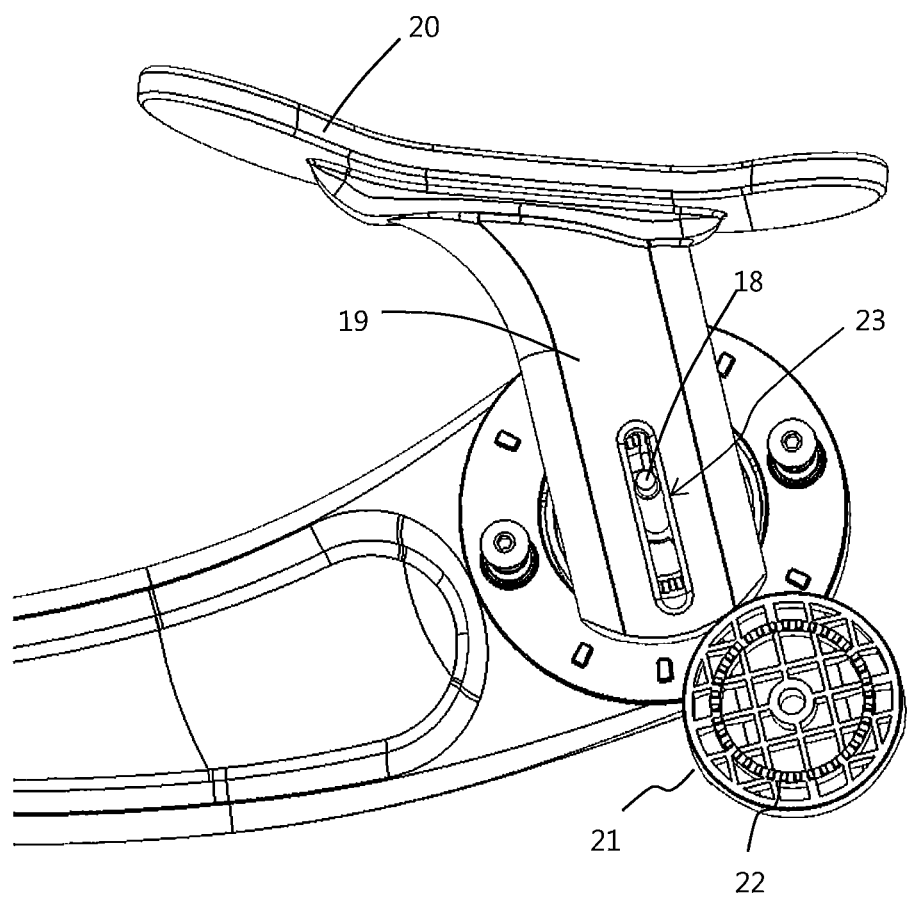
FIG. 10 illustrates a detail view of one rear section, the seat-post and the seat clamp interlock to show the relationship between the seat-post and fastener.
Figure 11:
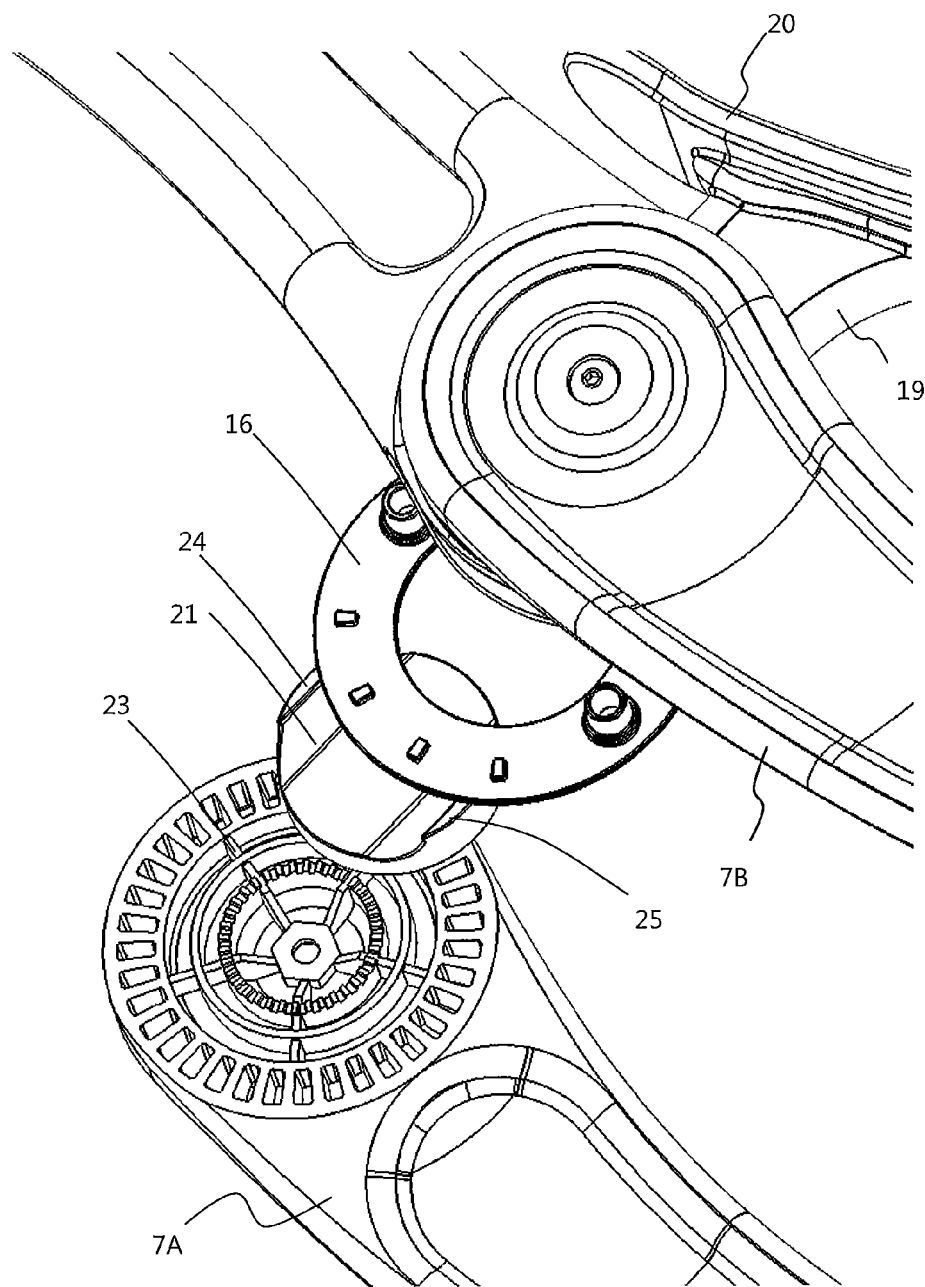
FIG. 11 illustrates the seat clamp interlock in an exploded view from the opposing side to that shown in FIGS. 8 to 10.
Figure 18:
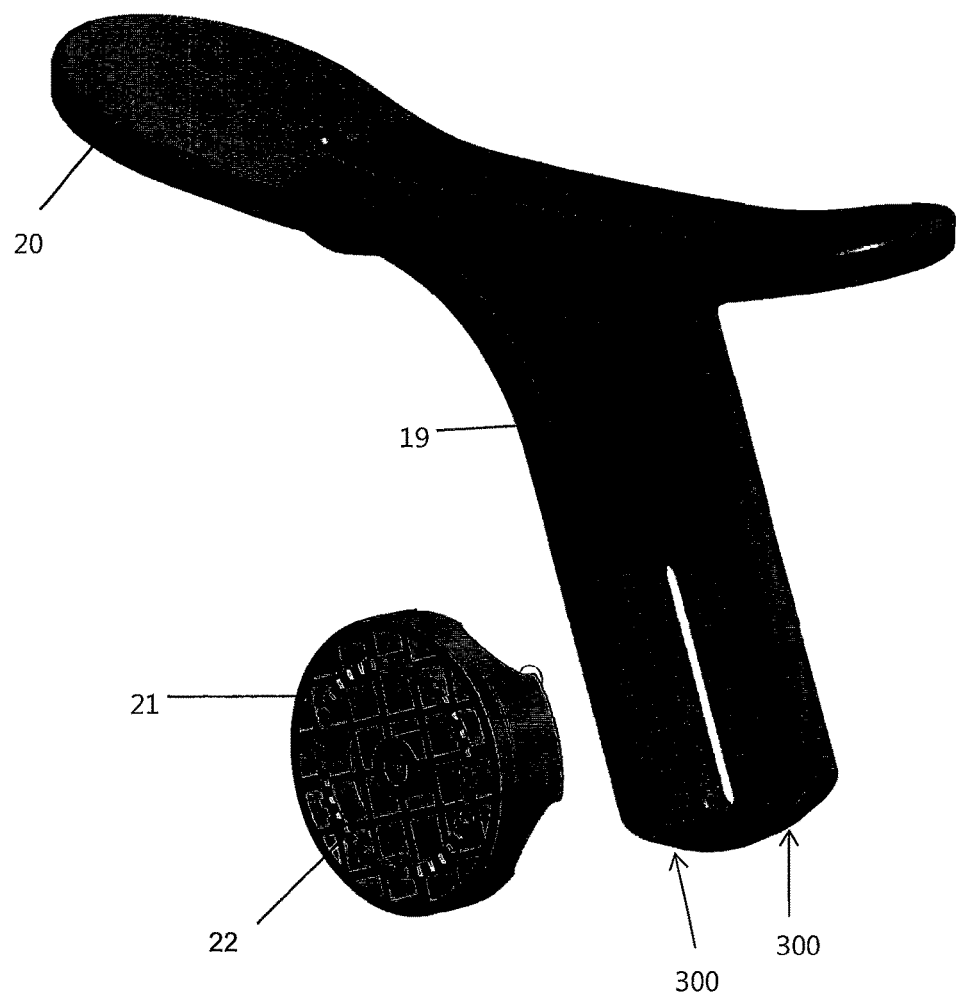
FIG. 18 illustrates a detail view from a first side of an alternative embodiment of seat clamp interlock using interlinking ribs and apertures between the seat-post and interlock; and, FIG. 19 illustrates a detail view from a second side of an alternative embodiment of seat clamp interlock using interlinking ribs and apertures between the seat-post and interlock.
Figure 19:
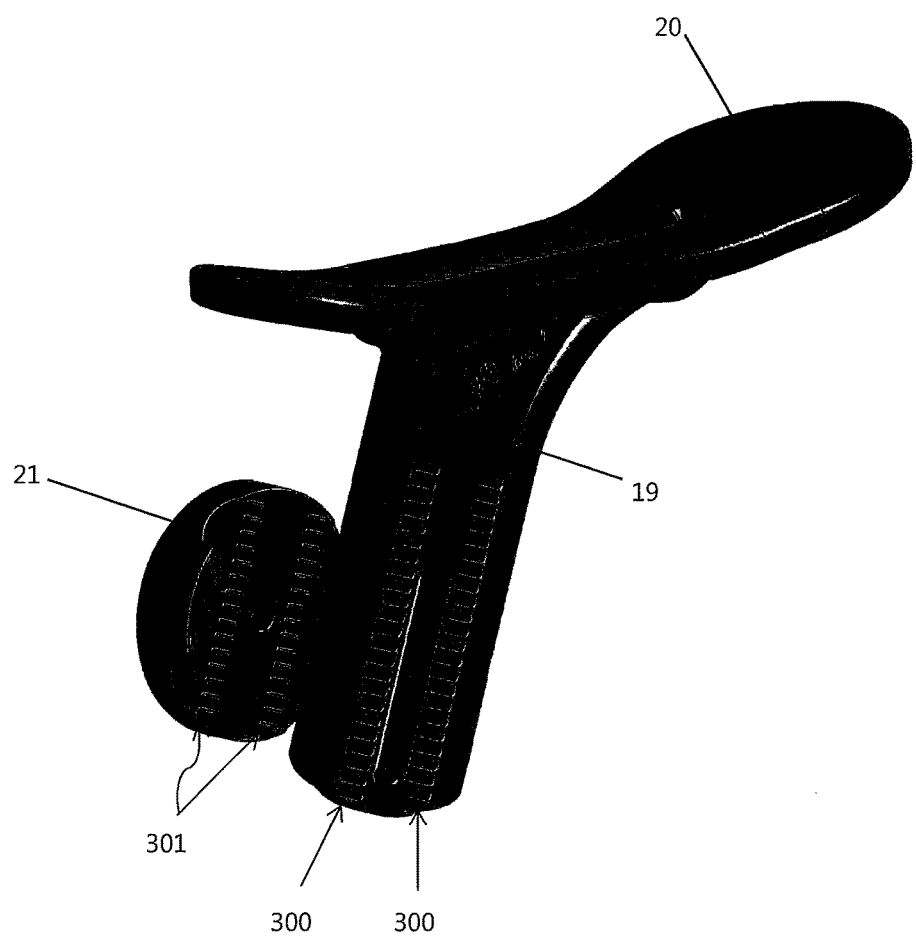

FIGS. 9 to 11 described above illustrate how the seat-post 19 and seat clamp interlock 21 interact together. In an alternative embodiment, the abutting faces of the seat-post 19 and seat clamp interlock 21 may have interlinking elements 300, 301. Referring to FIGS. 18 and 19, similar views to that of FIGS. 9 to 11 are shown however the seat clamp interlock 21 includes ribbed features 301 that interlink with complementary apertures 300 in the seat-post 19. This approach may be useful to help maintain the seat-post 19 position within the connection assembly 8.

Example 6

As best seen in FIGS. 1-2 and 12-14, the bike 1 or trike 100 may be made using a minimal number of parts, the parts being formed via gas assisted injection moulding (in part or in full). The advantages of this process to mould the parts are described in detail above, however, as can be seen in the drawings, parts such as the front forks 5 may be moulded as one part. Art front forks generally required the use of multiple parts since it was difficult to integrate all of the parts as in this case. Also as can be seen in the drawings, the parts can take on very different shapes and each part may have shape variations as shown for example in the two halves 6,7 of the main frame 4.

Aspects of the bike have been described by way of example only and it should be appreciated that modifications and additions may be made thereto without departing from the scope of the claims herein.

What I claim is:

1. A bike comprising:
   at least two wheels that convey the bike over a ground surface;
   a frame member supported between at least one front wheel and at least one rear wheel, wherein the at least one front wheel and the at least one real wheel are located approximate each distal end of the frame member and wherein the frame member comprises
      a first forward section or a plurality of first forward sections extending from the at least one front wheel,
      a second rear section or a plurality of second rear sections extending from the at least one rear wheel, and
      wherein endings of the first forward section or the plurality of first forward sections and endings of the second rear section or the plurality of second rear sections mate about a lockable connection assembly;
   a handle bar at a front wheel end of the bike in communication with the at least one front wheel and a first distal end of the frame member; and,
   a seat configured to be used by a rider to sit on when the bike is used;
   wherein at least one or more of part or all of the handle bar and the seat is a hollow tubular section that comprises aluminum or plastic, or is manufactured via gas assisted injection molding,
   wherein part or all of the frame member is a hollow tubular section that comprises aluminum or plastic, or is manufactured via gas assisted injection molding, and
   wherein the frame member comprises a contoured wall thickness that is rigid enough configured to withstand torsional forces when in use and light enough configured to allow the rider to propel the bike with the rider's own energy.

2. The bike as claimed in claim 1 wherein the bike or parts of the bike comprises materials that comprise engineered resins.

3. The bike as claimed in claim 1 wherein the at least one or more of part or all of the frame member, the handle bar, and the seat has no weld points.

4. The bike as claimed in claim 1 further comprising offset elements that are designed and molded to overlap.

5. The bike as claimed in claim 1 wherein each gas assisted injection molded part of the frame member and of at least one or more of part or all of the handle and the seat includes shapes comprising one or more of oval, elliptical and i-beam forms.

6. The bike as claimed in claim 1 wherein at least one or more of part or all of the frame member, the handle bar, and the seat comprises both hollow and non-hollow elements.

7. The bike as claimed in claim 1 wherein the gas assisted injection molding incorporates high volume overflow during gas assisted molding.

8. The bike as claimed in claim 1 wherein the frame member comprises a single frame member linking the at least one rear wheel to a front fork.

* * * * *

UNITED STATES PATENT AND TRADEMARK OFFICE
CERTIFICATE OF CORRECTION

PATENT NO.         : 10,040,500 B2
APPLICATION NO.    : 14/893918
DATED              : August 7, 2018
INVENTOR(S)        : Richard David Barnaby Latham Page 1 of 1

It is certified that error appears in the above-identified patent and that said Letters Patent is hereby corrected as shown below:

In the Claims

Column 15, Line 33, Claim 1, replace "one front wheel and the at least one real wheel are" with --one front wheel and the at least one rear wheel are--.

Column 16, Line 30, Claim 5, replace "at least one or more of part or all of the handle and the seat" with --at least one or more of part or all of the handle bar and the seat--.

Signed and Sealed this
Fourth Day of December, 2018

Andrei Iancu
*Director of the United States Patent and Trademark Office*